(12) United States Patent
Harmer (10) Patent No.: US 6,717,765 B2
(45) Date of Patent: Apr. 6, 2004

(54) METHOD AND CIRCUIT FOR SENSING BACK EMF

(75) Inventor: Brent Jay Harmer, West Point, UT (US)

(73) Assignee: Iomega Corporation, San Diego, CA (US)

(*) Notice: Subject to any disclaimer, the term of this patent is extended or adjusted under 35 U.S.C. 154(b) by 391 days.

(21) Appl. No.: 09/887,590

(22) Filed: Jun. 22, 2001

(65) Prior Publication Data

US 2002/0196577 A1 Dec. 26, 2002

(51) Int. Cl.[7] ............................................... G11B 5/596
(52) U.S. Cl. ...................... 360/78.06; 360/75
(58) Field of Search ...................... 360/78.06, 78.04, 360/75

(56) References Cited

U.S. PATENT DOCUMENTS

| 5,666,236 A | 9/1997 | Bracken et al. ............... 360/75 |
| 5,844,743 A | 12/1998 | Funches .................. 360/78.04 |
| 6,097,564 A | * 8/2000 | Hunter .................... 360/78.04 |

* cited by examiner

Primary Examiner—David Hudspeth
Assistant Examiner—Mitchell Slavitt
(74) Attorney, Agent, or Firm—James T. Hagler (57) ABSTRACT

Method and apparatus are disclosed allowing for velocity sensing using back EMF in a media drive. A back EMF sensing circuit is provided that generates a velocity signal proportional to the back EMF in the head arm actuator coil, which signal may be utilized to improve head positioning control capabilities.

20 Claims, 7 Drawing Sheets

METHOD AND CIRCUIT FOR SENSING BACK EMF

FIELD OF THE INVENTION

The present invention relates to data storage devices having actuators, and more specifically, to integrated circuit technology and a method for sensing the back electromagnetic force (EMF) of an actuator to provide better control over the actuator.

BACKGROUND OF THE INVENTION

Data storage devices, and in particular, data storage devices of the type that accept a removable cartridge containing a disk-shaped storage medium, usually employ either a linear actuator mechanism or a rotary arm actuator mechanism for positioning the read/write head(s) of the disk drive over successive tracks of the disk-shaped storage medium. In most disk drives, and particularly in those that receive removable disk cartridges, the linear or rotary arm actuators are moved to a retracted, or parked position when the disk drive is not in use. In such a retracted position, the read/write heads of the disk drive are moved off and away from the surface(s) of the storage medium in order to prevent damage to the head(s) and storage medium. In order to resume use of the disk drive, the read/write heads must once again be loaded onto the surface(s) of the storage medium so that the data transfer can begin. It is important that the head loading operation be carried out in a controlled manner to prevent damage to the read/write heads.

Some magnetic storage devices support a head loading velocity control mechanism for a disk drive that measures the back EMF voltage across the actuator of the disk drive to obtain an indication of the velocity of the actuator. The measured back EMF voltage is then employed in a control scheme to control the velocity of the actuator during a head loading operation. Unfortunately, the circuitry needed to measure the back EMF voltage across the actuator increases the cost and complexity of the disk drive. Furthermore, this technique provides only a rough control of the actuator velocity, which may not be acceptable in many applications.

Comparatively, other magnetic storage devices utilize a velocity control technique for a disk drive actuator that employ thermal measurements to estimate the velocity of the actuator. Again, however, the circuitry necessary to obtain accurate thermal measurements unduly increases the cost of the disk drive, and this technique is susceptible to inaccuracies.

Further yet, some devices employ high-precision glass scales affixed to a disk drive actuator for obtaining accurate position and track counting information during track seek operations. See, e.g., Thanos et al., U.S. Pat. No. 5,084,791. Unfortunately, the cost and complexity of the high-precision glass scales and associated optical circuitry make them disadvantageous. Certain products in the "BETA" line of Bernoulli disk drives manufactured by Iomega Corporation, the assignee of the present invention, employ an optical sensor and a gray-scale pattern affixed to a linear drive actuator to obtain an indication of the linear position of the actuator. However, these products do not, and are not capable of, deriving or controlling the velocity of the actuator using the position information generated with the gray-scale pattern and optical sensor.

In view of the foregoing, there exists a need for a data storage drive having the ability to sense and process back EMF originating from the data storage drive actuator to provide improved control over the actuator.

SUMMARY OF THE INVENTION

The present invention provides a method and system for a data storage device in which a velocity signal is generated that is proportional to the back EMF in the head arm actuator coil of the data storage device, wherein the velocity signal is utilized in connection with controlling the position of the head(s).

Additional features and advantages of the present invention will become evident from the below description of the invention.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF THE INVENTION

Overview

Modern hard disk drives comprise one or more rigid disks that are coated with a magnetizable medium and mounted on the hub of a spindle motor for rotation at a constant high speed. Information is stored on the disks in a plurality of concentric circular tracks by an array of transducers ("heads") mounted to a rotary actuator for movement of the heads relative to the disks.

The heads are mounted via flexures at the ends of a plurality of arms that project radially outward from a substantially cylindrical actuator body. The actuator body pivots about a shaft mounted to the disk drive housing at a position closely adjacent the outer extreme of the disks. The pivot shaft is parallel with the axis of rotation of the spindle motor and the disks so that the heads move in a plane parallel with the surfaces of the disks.

Typically, the actuator employs a voice coil motor to position the heads with respect to the disk surfaces. The actuator voice coil motor includes a coil mounted on the side of the actuator body opposite the head arms so as to be immersed in the magnetic field of an array of permanent magnets. When controlled DC current is passed through the coil, an electromagnetic field is set up which interacts with the magnetic field of the permanent magnets and causes the coil to move relative to the permanent magnets in accordance with the well-known Lorentz relationship. As the coil moves relative to the permanent magnets, the actuator body pivots about the pivot shaft and the heads are moved across the disk surfaces.

The heads are supported over the disks by actuator slider assemblies that include air-bearing surfaces designed to interact with a thin layer of moving air generated by the rotation of the disks, so that the heads are said to "fly" over the disk surfaces. Generally, the heads write data to a selected data track on the disk surface by selectively magnetizing portions of the data track through the application of a time-varying write current to the head. In order to subsequently read back the data stored on the data track, the head detects flux transitions in the magnetic fields of the data track and converts these to a signal which is decoded by read channel circuitry of the disk drive.

Control of the position of the heads is typically achieved with a closed loop servo system. In such a system, head position (servo) information is provided to the disks to detect and control the position of the heads. As will be recognized, a dedicated servo system entails the dedication of one entire surface of one of the disks to servo information, with the remaining disk surfaces being used for the storage of user data. Alternatively, an embedded servo system involves interleaving the servo information with the user data on each of the surfaces of the disks so that both servo information and user data is read by each of the heads.

With either a dedicated or embedded servo system, it is common to measure or estimate various parameters including head position, velocity and acceleration and to use these parameters in the closed-loop control of the position of the head. For example, during track following, which involves causing the head to follow a selected track on the disk, a position error signal (PES) indicative of the relative distance between the head and the center of the selected track is generated from the servo information associated with the track. The PES is used to generate correction signals that adjust the position of the head by adjusting the amount of current applied to the actuator coil. Additionally, during a seek, which involves the acceleration and subsequent deceleration of the head from an initial track to a destination track on the disk, the radial velocity of the head is typically measured (or estimated) and compared to a profile velocity, with correction signals being generated from the differences between the actual velocity and the profile velocity of the head.

As track densities and rotational speeds of modern disk drives continue to increase, closed-loop control of head position becomes increasingly critical to ensure reliable performance of the drives. However, such increases in track density and rotational speed tend to reduce the accuracy in the measured or estimated parameters used to control the position of the heads. Thus, there is a continual need for improved approaches to accurately measuring or estimating the control parameters used in the servo loops of modern disk drives.

Exemplary Operating Environment for the Invention

Figure 1:
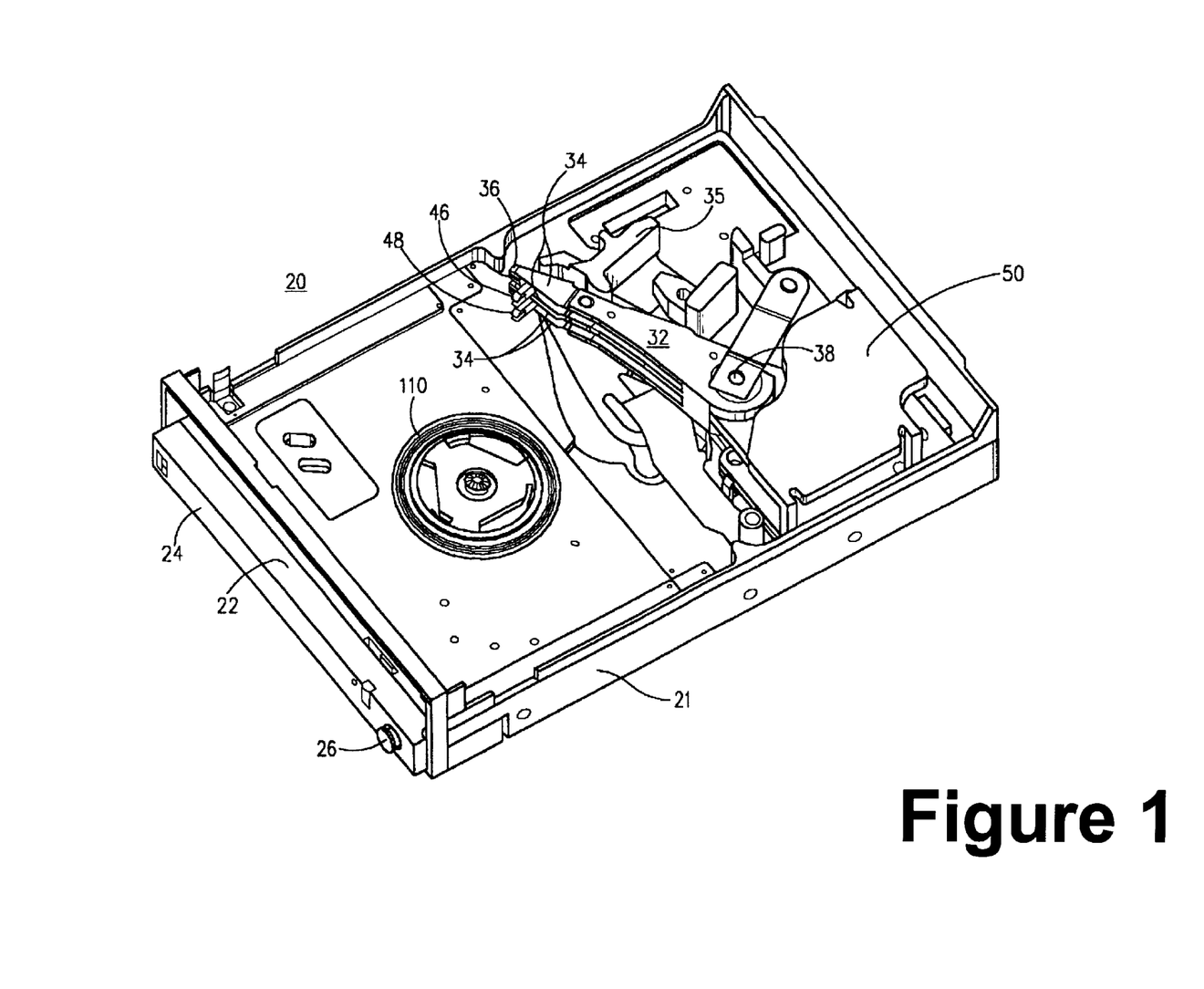
FIG. 1 is a perspective view of an exemplary data storage device, or disk drive, in which the present invention may be employed.

Referring to the drawings wherein like numerals indicate like elements throughout, there is shown in FIG. 1 an exemplary data storage device 20, or disk drive, in which the present invention may be employed. The exemplary disk drive 20 is of the type that receives a removable disk cartridge, however, the present invention is by no means limited thereto. For example, the present invention can also be employed in a fixed-disk type drive, or any device that implicates accurate actuator control.

As shown in FIG. 1, the exemplary disk drive 20 comprises a chassis 21 on which a number of disk drive components are mounted. A front panel 24 of the disk drive 20 has a substantially horizontal opening 22 for receiving a removable disk. An eject button 26 is provided on the front panel for ejecting a disk cartridge from the disk drive 20. A spindle motor 110 is mounted on the chassis 21 to provide a means for rotating the storage media within a disk cartridge.

An actuator arm 32, which forms part of a rotary arm voice coil actuator, is pivotally mounted to the drive chassis 21 at 38. The actuator arm 32 has a plurality of suspension arms 34 at its distal end that each carry a respective read/write head 36 for recording to and reading information from the surfaces of the storage media of a disk cartridge. A head loading mechanism 35 facilitates loading of the magnetic heads onto the storage media. The head loading mechanism comprises a pair of load ramp structures 46, 48 upon which the suspension arms 34 of the actuator arm 32 ride during head loading/unloading operations.

Figure 3:
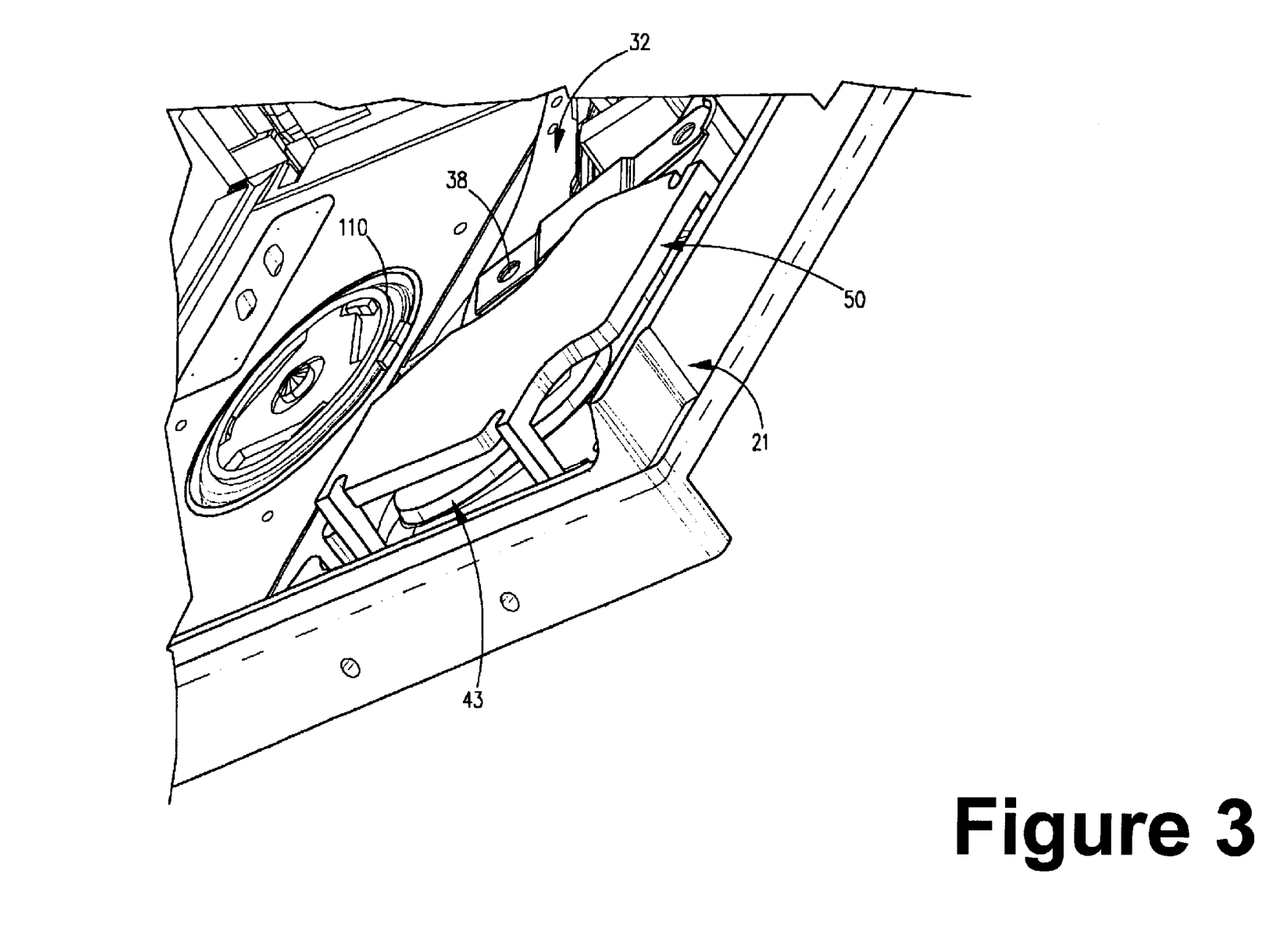
FIG. 3 is a perspective view of a portion of the exemplary disk drive of FIG. 1.
Figure 4:
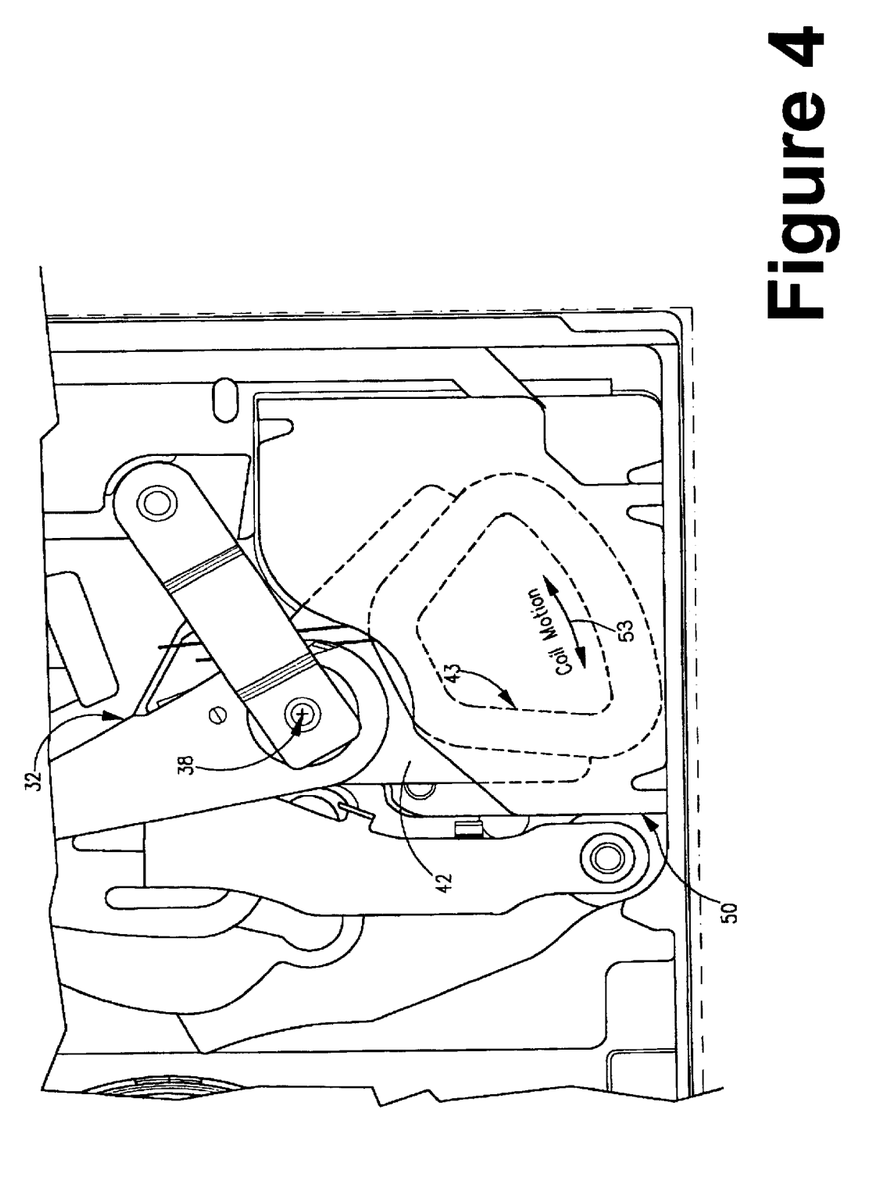
FIG. 4 is a plan view of the portion of the disk drive illustrated in FIG. 3.

Further details concerning a head loading mechanism of the type shown at 35 can be found U.S. patent application Ser. No. 08/438,254, entitled "Head Loading Mechanism for a Disk Drive," filed May 10, 1995, which is incorporated herein by reference in its entirety. An exemplary voice coil element 43 is illustrated in FIGS. 3 and 4. Voice coil element 43 is affixed to a forked member 42 at the other end of the actuator arm 32 for controlling the rotational movement of the arm 32. A magnet return path assembly 50 is mounted to the chassis 21 and provides a magnet return path for the voice coil element 43. The motion of the coil is depicted along path 53. The motion of the coil relative to the magnet return path assembly 50 forms the basis of the back EMF signal measured, interpreted and/or processed by the present invention for the purpose of controlling the position of the head(s) 36.

Figure 2:
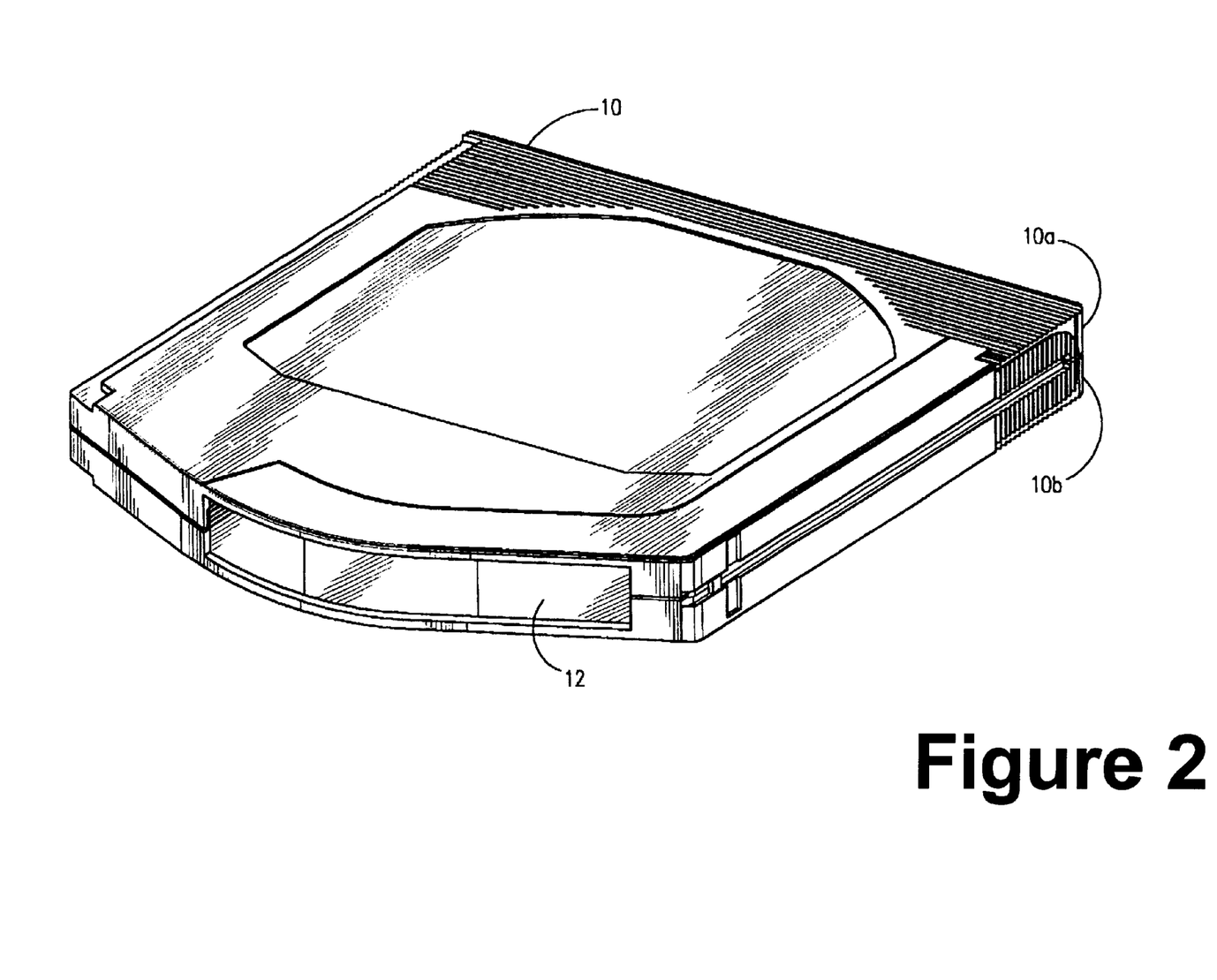
FIG. 2 is a perspective view of an exemplary removable storage medium, such as a disk cartridge, for use in connection with the disk drive of FIG. 1.

FIG. 2 is a perspective view of a disk cartridge 10 that may be used with the removable cartridge disk drive 20 of FIG. 1. The disk cartridge 10 comprises an outer casing consisting of upper and lower shells 10a, 10b, respectively. Preferably, the upper and lower shells 10a, 10b are formed of a rigid plastic material. A door 12 on the casing provides access to the recording disks by the read/write heads of a disk drive. In the present embodiment, the storage media comprise rigid magnetic media, however, other storage media may be employed, such as flexible magnetic media or optical media. As described hereinafter in greater detail, when the disk cartridge 10 is inserted into the disk drive 20, the actuator arm 32 will rotate counter-clockwise (as viewed in FIG. 1) causing the suspension arms 34 of the actuator to move off the load ramp structures 46, 48, thereby loading the read/write heads 36 onto the surfaces of the storage media within the cartridge 10.

Back EMF Sensing Tachometer

Figure 5:
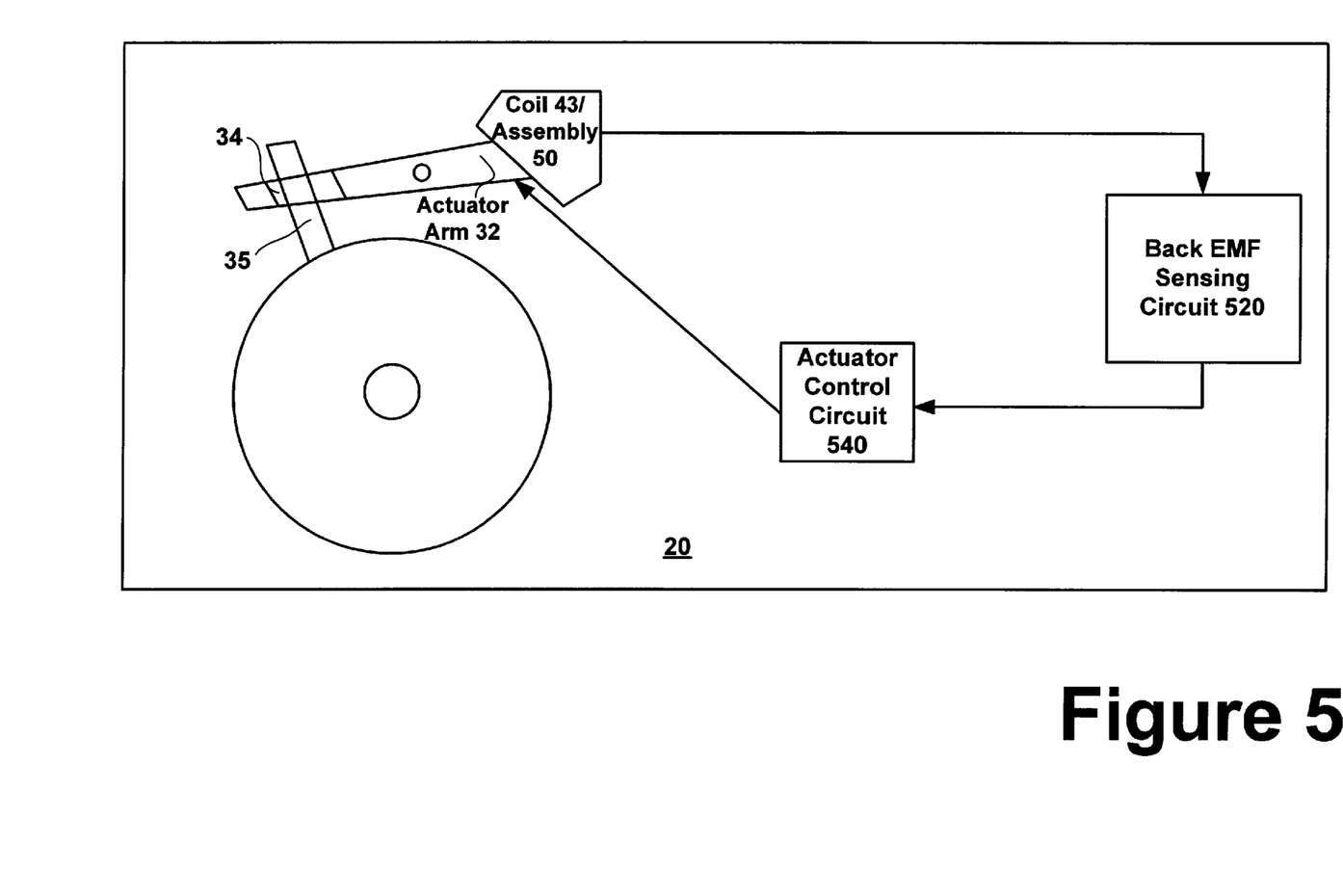
FIG. 5 is a block diagram showing the interaction of components to realize tachometer functions in accordance with the present invention.

FIG. 5 is a block diagram that illustrates exemplary operation of the present invention in connection with controlling an actuator arm 32. In accordance with the present invention, an improved back EMF sensing circuit 520 receives as an input a back EMF signal generated as a result of movement of coil 43 relative to magnet assembly 50. Circuit 520 outputs an indication of the rotational velocity of the actuator arm 32 as an input to circuit 540 that controls the actuator. As will be appreciated by one of ordinary skill in the art, back EMF sensing circuit 520 may be provided separately or integrally formed with control circuit 540 and/or any other electronic component included in the control system.

Figure 6:
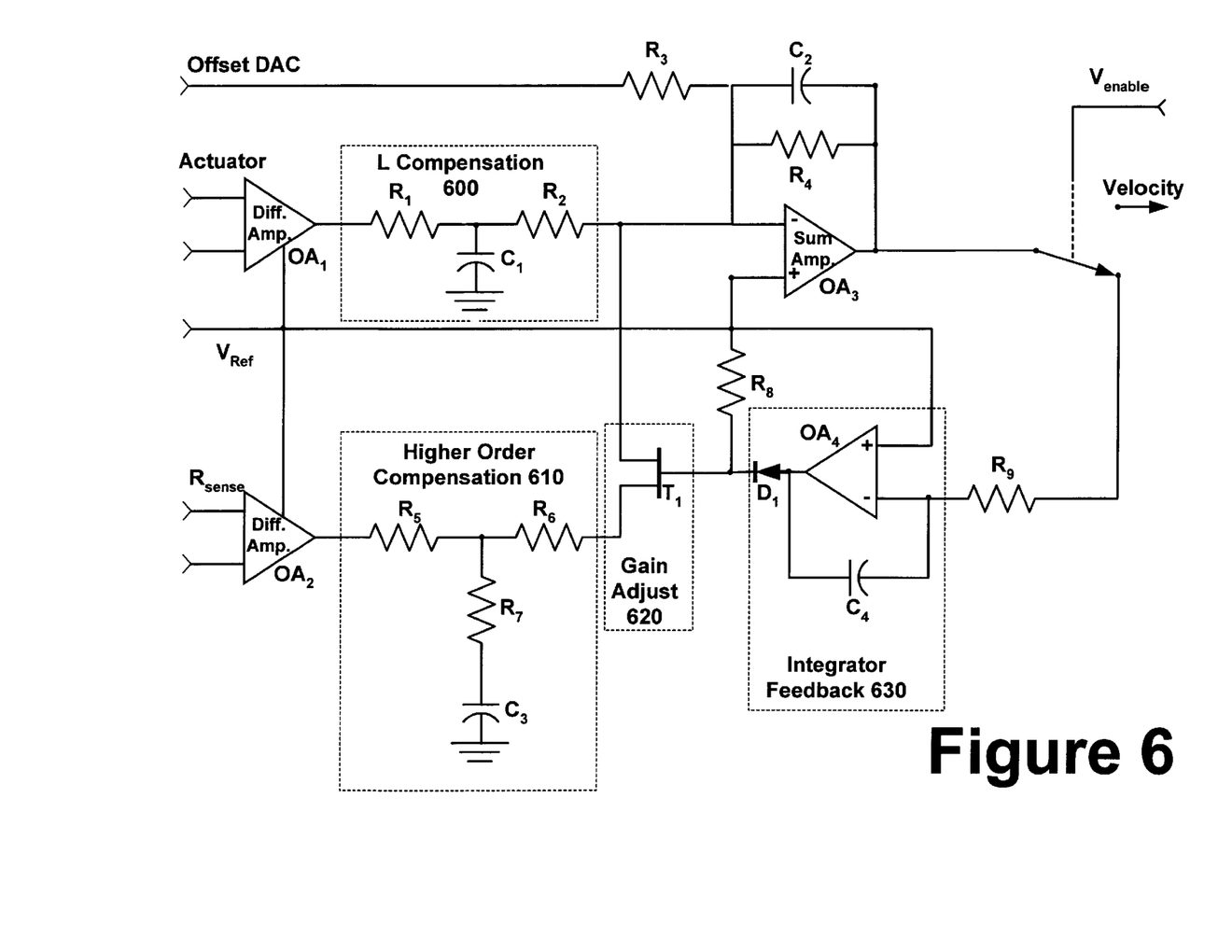
FIG. 6 is a schematic circuit diagram of an illustrative back EMF sensing electronic circuit to realize tachometer functions in accordance with the present invention.

FIG. 6 is a circuit diagram of an embodiment of the back EMF sensing circuit 520 in accordance with the present invention. As related in the background section, there is a need for an improved back EMF sensing circuit in the art. The back EMF sensing circuit 520 of the present invention advantageously provides several new improvements vis-á-vis the prior art. The back EMF sensing circuit 520 advantageously provides an integrator feedback technique to more accurately cancel out coil resistance error. The back EMF sensing circuit 520 further advantageously provides inductance compensation via pole-zero cancellation. The back EMF sensing circuit 520 still further advantageously provides higher order compensation to more accurately cancel out coil higher order impedance effects.

Circuit 520 includes operational amplifiers $OA_1$, $OA_2$, $OA_3$, $OA_4$, resistors $R_1$, $R_2$, $R_3$, $R_4$, $R_5$, $R_6$, $R_7$, $R_8$, $R_9$, capacitors $C_1$, $C_2$, $C_3$, $C_4$, transistor $T_1$, and diode $T_1$, In accordance with circuit 520, an analog signal representative of head arm actuator velocity is generated by detecting back EMF in the actuator coil 43. This velocity signal may be used in several ways: to provide velocity control of the head arm actuator 32 while loading the heads 36 onto the media or while parking the heads 36 onto the load ramp, to provide analog velocity signal for improved position control during seeks, to provide analog velocity signal for improved position control during track follow, to provide feed forward for canceling the effects of external shocks applied to the drive and to provide an indicator of external shock applied to the drive. The velocity output of the present invention is thus an improved indication of the velocity of the actuator 32, and may be utilized for a variety of different purposes.

The present invention provides additional features as well. L compensation portion 600 reduces error created by coil inductance by providing appropriate values in the RC circuit of portion 600. Higher order compensation portion 610 reduces error introduced by higher order effects by providing appropriate values in the RC circuit of portion 610. Gain adjust portion 620 reduces error caused by resistance in the actuator coil by subtracting a scaled voltage measured across a series current sense resistor. D.C. error due to amplifier offsets is reduced by the addition of an external Digital to Analog Converter (DAC) Input, entitled "Offset DAC."

Figure 7:
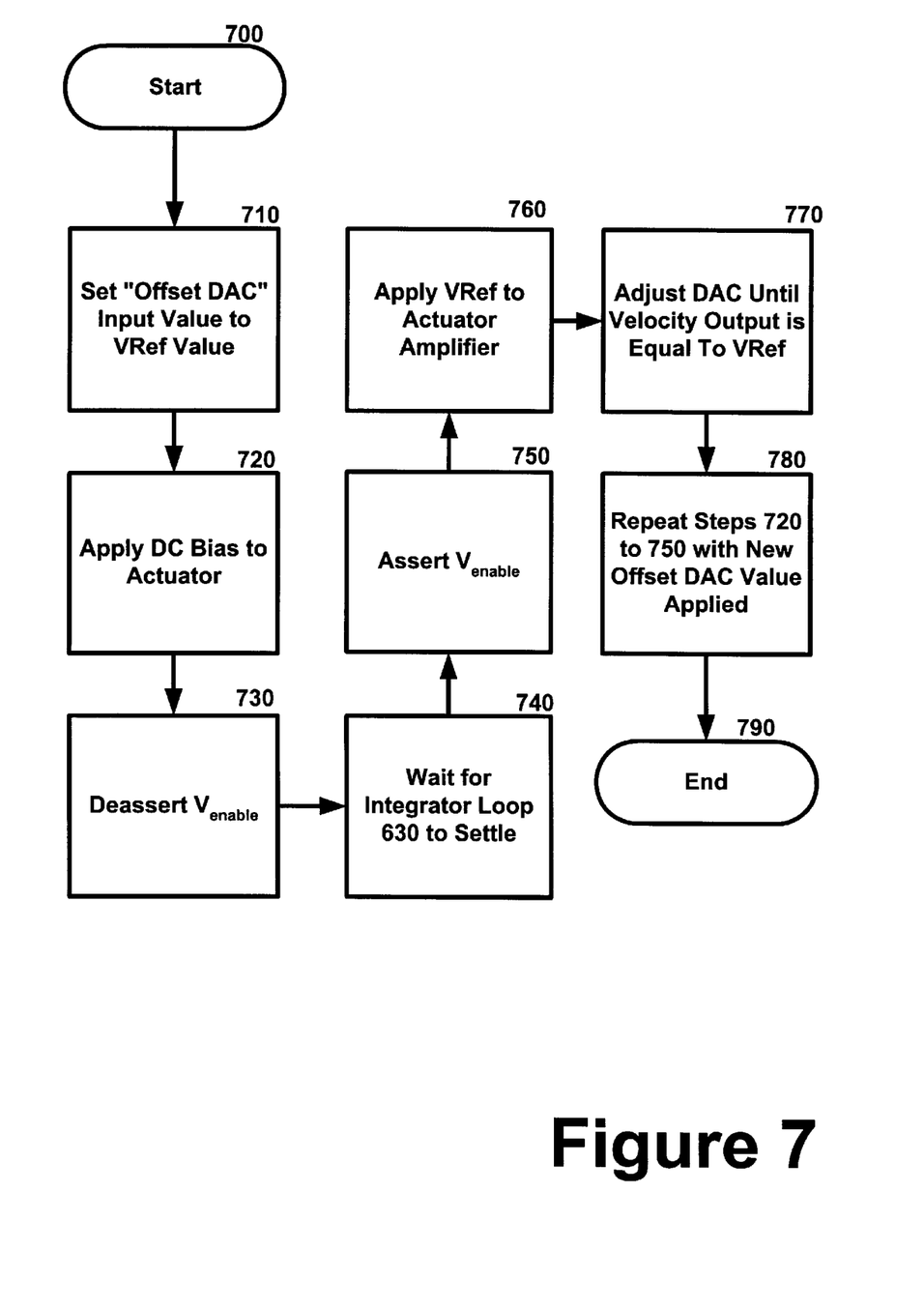
FIG. 7 is a flowchart diagram of a calibration operation performed in connection with the back EMF sensing electronic circuit that realizes tachometer functions in accordance with the present invention.

FIG. 7 is a flow diagram illustrating an exemplary method for calibrating the actuator control system. The calibration procedure may be utilized at power up of the device 20 prior to loading the heads onto the storage medium. After start 700, the offset DAC input is set to be equal to $V_{REF}$ at 710. At 720, a DC bias is applied to the actuator 32 so as to bias the head arm assembly up against the outer crash stop (not shown) on the load ramp. At 730, $V_{ENABLE}$ is de-asserted so as to connect the velocity output to the integrator $OA_4$. At 740, integrator feedback loop 630 settles to a value i.e, integrator $OA_4$ provides closed loop feedback to adjust the gain of the resistance compensation branch until the resulting velocity output is equal to the analog reference voltage, $V_{REF}$. At 750, $V_{ENABLE}$ is asserted, disconnecting the sum amplifier $OA_3$ from the integrator $OA_4$, and thereby holding the integrator output and the resulting gain adjust value constant. Steps 710 to 750 are utilized to provide an initial approximate gain adjust value for use in the DC offset adjustment. After the DC offset is adjusted at 770, these procedures are again followed to provide fine adjustments to the resistance compensation gain. At 760, $V_{REF}$, the analog reference voltage, is applied to the actuator amplifier such that very little current flows in the actuator coil. At 770, the offset DAC is adjusted until the velocity output is equal to the analog reference voltage, $V_{REF}$. At 780, steps 720 through 750 are repeated with the new offset DAC value applied and the flow ends at 790.

After powerup, $V_{ENABLE}$ is periodically de-asserted in order to update the resistance compensation gain in response to coil and sense resistance value changes caused by temperature variation. While this update occurs, the heads must be positioned on a track such that the DC bias applied to the actuator amplifier is of the same polarity as the initial bias applied in step 720, described above.

Once calibrated, the circuit 520 provides a velocity output and as mentioned, the velocity may be utilized for a variety of reasons including, but not limited to providing velocity control of the head arm actuator while loading the heads 36 onto the media or while parking the heads onto the load ramp, providing analog velocity signal for improved position control during seeks, providing analog velocity signal for improved position control during track follow, providing feed forward for canceling the effects of external shocks applied to the drive and providing an indicator of external shock applied to the drive. The circuit 520 of the present invention provides a velocity control circuit that operates for a bandwidth of approximately 1 kHz, an improvement over prior art circuits providing less bandwidth. The velocity output of the present invention is thus an improved indication of the velocity of an actuator, and may be utilized for a variety of different purposes.

As the foregoing illustrates, the present invention is directed to methods and apparatus for booting a computer system and loading drivers from a removable media disk drive. In a PC system that boots an operating system from a storage device, the present invention provides a means for booting from a removable media drive. It is understood, however, that changes may be made to the embodiments described above without departing from the broad inventive concepts thereof. For example, while the method of the present invention is particularly well suited to an IDE interfaced removable media drive, the same method may be used to boot a PC system from a removable media drive connected to a different interface, such as SCSI. Furthermore, the invention may be applied to any apparatus having an actuator for which a tachometer is desirable. Accordingly, this invention is not limited to the particular embodiments disclosed, but is intended to cover all modifications that are within the scope and spirit of the invention as defined by the appended claims.

What is claimed is:

1. Back EMF sensing tachometer circuitry for measuring the back EMF of a coil of an actuator and for generating a signal for control of the velocity of the actuator, comprising:

means for receiving a back EMF signal from the coil;

an integrator feedback element having a gain adjust element for reducing error caused by resistance of the coil, wherein said gain adjust element reduces error caused by resistance in the actuator coil by subtracting a scaled voltage measured across a series current sense resistor; and     means for outputting a velocity signal for controlling the velocity of the actuator.

2. Back EMF sensing tachometer circuitry according to claim 1, further comprising an inductance compensation element having a first RC circuit portion for reducing error caused by inductance of the coil.

3. Back EMF sensing tachometer circuitry according to claim 2, wherein the error created by coil inductance is reduced by pre-selecting appropriate values for at least one resistor and at least one capacitor of the first RC circuit portion of the inductance compensation element.

4. Back EMF sensing tachometer circuitry for measuring the back EMF of a coil of an actuator and for generating a signal for control of the velocity of the actuator, comprising:

means for receiving a back EMF signal from the coil;

an integrator feedback element having a gain adjust element for reducing error caused by resistance of the coil;

means for outputting a velocity signal for controlling the velocity of the actuator; and a higher order compensation element having a second RC circuit portion for reducing higher order effects that influence the operation of the circuit.

5. Back EMF sensing tachometer circuitry according to claim 4, wherein the error created by the higher order effects is reduced by pre-selecting appropriate values for at least one resistor end at least one capacitor of the second RC circuit portion of the higher order compensation circuit.

6. Back EMF sensing tachometer circuitry according to claim 1, further comprising means for receiving an external digital to analog converter (DAC) offset input.

7. Back EMF sensing tachometer circuitry according to claim 6, wherein said means for receiving an external digital to analog converter (DAC) offset input reduces error due to amplifier offsets.

8. Back EMF sensing tachometer circuitry according to claim 1, wherein after calibration of the back EMF sensing tachometer circuitry, the back EMF sensing circuitry generates a velocity control signal that operates for a bandwidth of approximately 1 kHz for controlling the velocity of an actuator arm.

9. A method for calibrating a back EMF sensing tachometer circuit used for controlling a velocity of an actuator via a velocity output voltage signal, comprising:

setting an offset DAC input of the circuit equal to a reference voltage;

applying a DC bias to the actuator;

disconnecting via a switch the velocity output voltage signal for controlling the velocity of the actuator and thereby connecting the velocity output voltage signal instead to on input of an integrator feedback portion;

waiting for at least one of an input and an output of the integrator feedback portion to stabilize;

re-connecting via the switch the standard velocity output voltage signal and thereby disconnecting the velocity output voltage signal from the input of the integrator feedback portion; and in accordance with an output of the integrator feedback portion, setting an initial approximate gain adjust value for use in DC offset adjustment.

10. A method according to claim 9, wherein after the setting of the initial approximate gain adjust value, the method further includes:

applying the reference voltage to an actuator amplifier;

adjusting the offset DAC input until the velocity output voltage signal is equal to the reference voltage; and to provide finer adjustments to the resistance compensation gain adjust value, the method further includes again performing the steps of said applying of the DC bias to the actuator;

said disconnecting via the switch of the velocity output voltage signal for controlling the velocity of the actuator and said concomitant connecting of the velocity output voltage signal instead to art input of the integrator feedback portion;

said waiting for at least one of an input and an output of the integrator feedback portion to stabilize; and said re-connecting via the switch of the standard velocity output voltage signal and said concomitant disconnecting of the velocity output voltage signal from the input of the integrator feedback portion.

11. A method according to claim 10, wherein said applying of the reference voltage to an actuator amplifier causes very little current to how in the actuator coil.

12. A method according to claim 9, wherein said disconnecting of the velocity output voltage signal from the input of the integrator feedback portion holds the integrator output and the resulting gain adjust value constant.

13. A method according to claim 9, wherein said connecting of the velocity output voltage instead to an input of an integrator feedback portion includes connecting the velocity output voltage to the input of the integrator feedback portion across a resistor.

14. A method according to claim 9, wherein the method is performed at power up of a storage device having the back EMF sensing tachometer circuit prior to loading heads onto a storage medium.

15. A method according to claim 9, further comprising detecting back EMF from an actuator coil.

16. A method according to claim 9, wherein said waiting for at least one of an input and an output of the integrator feedback portion to stabilize includes receiving closed loop feedback from an integrator of the integrator feedback portion to adjust the gain of the resistance compensation branch until the resulting velocity output voltage signal is equal to the reference voltage.

17. A method according to claim 9, wherein once the beck EMF sensing circuit is calibrated, the velocity output voltage signal may be used for at least one of: providing velocity control of the head arm actuator while loading heads onto media, providing velocity control of the head arm actuator while parking heads onto a load ramp, providing analog velocity signal for improved position control during seeks, providing an analog velocity signal for improved position control during a track follow operation, providing feed forward for canceling the effects of external shocks applied to a storage device having the back EMF sensing tachometer circuit and providing an indicator of external shock applied to the a storage device having the back EMF sensing tachometer circuit.

18. A method according to claim 9, wherein an inductance compensation element having a first RC circuit portion reduces error caused by inductance of the coil.

19. A method according to claim 9, wherein a higher order compensation element having a second RC circuit portion reduces higher order effects that influence the operation of the circuit.

20. A method according to claim 9, wherein after calibration of the back EMF sensing tachometer circuitry, to back EMF sensing circuitry generates a velocity control signal that operates for a bandwidth of approximately 1 kHz for at least controlling the velocity of an actuator arm.

* * * * *